(No Model.)
W. W. ROCHE.
TRUCK.
No. 384,078. Patented June 5, 1888.
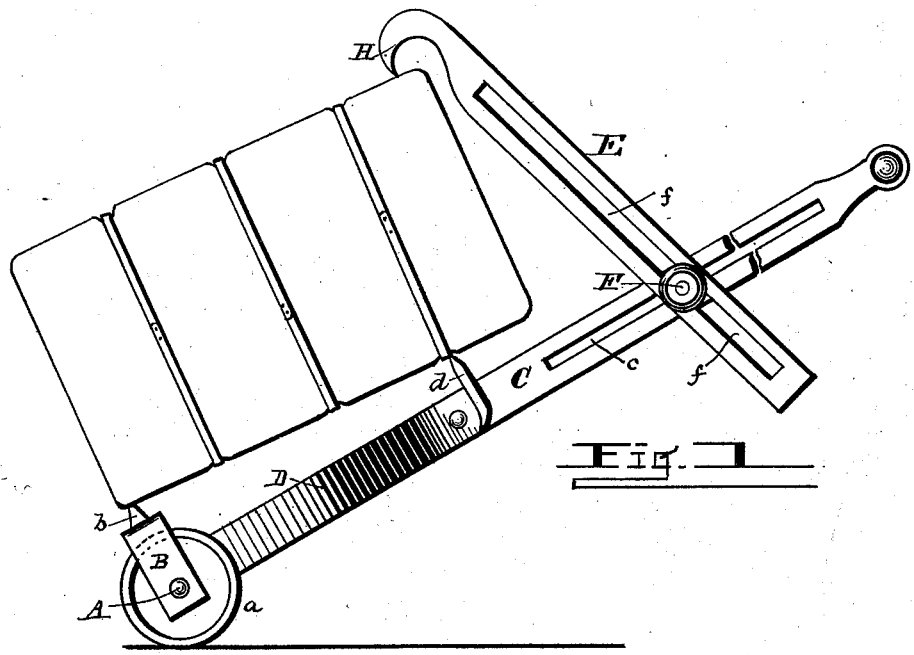
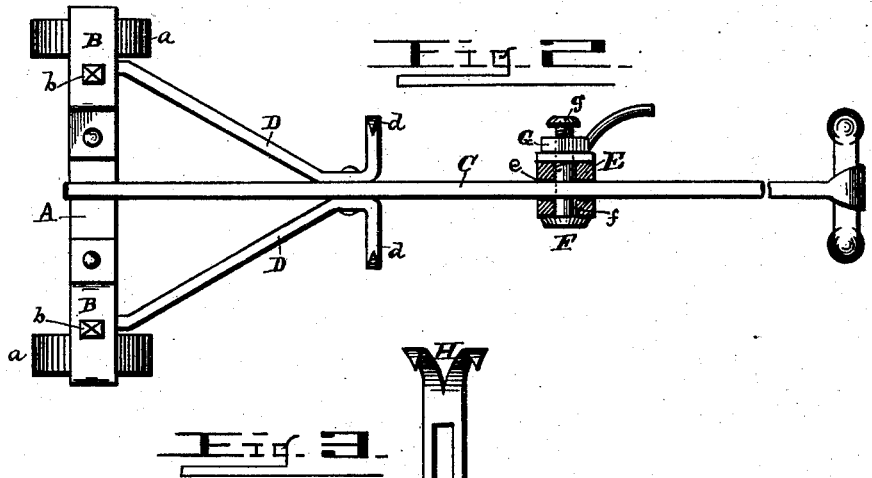
Witnesses
A. E. Dowell
Percy L. Brooks
Inventor
W. W. Roche
By His Attorney
J. H. Alexander

UNITED STATES PATENT OFFICE.

WILLIAM W. ROCHE, OF HAMPTON, VIRGINIA.

TRUCK.

SPECIFICATION forming part of Letters Patent No. 384,078, dated June 5, 1888.

Application filed February 23, 1888. Serial No. 265,015. (No model.)

*To all whom it may concern:*

Be it known that I, WILLIAM W. ROCHE, of Hampton, in the county of Elizabeth City and State of Virginia, have invented certain new and useful Improvements in Hand-Trucks; and I do hereby declare that the following is a full, clear, and exact description thereof, reference being had to the accompanying drawings, and to the letters of reference marked thereon, which form part of this specification, in which—

Figure 1 is a side view of my improved hand-truck in use. Fig. 2 is a top plan view of the same. Fig. 3 is a rear view.

This invention is an improvement in hand-trucks, and its objects are to improve the construction of the truck and provide it with an adjustable grip-bar for catching the boxes, &c., to be handled, thus enabling one man to move very large boxes, barrels, or bales without other assistance; and the invention consists in the novel construction and formation of the truck and grip-bar, as will be clearly understood from the within description and the drawings, and concisely stated in the claims.

Referring to the drawings by letter, A designates the truck-axle, of ordinary length, and carrying on its ends rollers $a\ a$. B B are angle-straps secured to the axle and over the rollers $a\ a$, as shown.

$b\ b$ are pointed studs or teeth projecting from straps B. If desired, similar studs may be secured on the axle between straps B B. (Not shown in the drawings.)

C designates the handle attached to axle A, and braced laterally thereon by bars D D, which are secured on the axle near the rollers, and converge to their point of attachment to the handle C, where they are properly secured and then turned upward and outward, forming pointed arms $d\ d$, as shown.

In operation the truck is run up close against the box, barrel, or other object to be moved, so that studs $b\ b$ will impinge on the same. The box is then tilted in the ordinary manner toward handle C, and studs $b$ will bite and lift the box, and arms $d$ will bite and support its other end, so that it can be readily moved on the truck without danger of it slipping.

When any large objects are to be moved, it has usually required two men to get them on a truck. I enable one man to move such objects by means of an adjustable grip-bar, E, which is slotted longitudinally, as at $e$, and slipped on handle C, the latter being flattened, preferably, as shown, to prevent lateral rocking of the grip-bar thereon. Grip-bar E has a second longitudinal slot, $f$, in it at right angles to slot $e$, and through slot $f$ plays a bolt, F, that also passes through a slot, $c$, in handle C, as shown. Bolt F is provided with a washer and hand-nut, G, on its threaded end, and with a keeper, $g$, for said nut, as shown. The upper end of grip-bar E is formed into or provided with claw H.

It can readily be seen that bar E is adjustable to or from axle A on handle C by reason of slot $c$, and that it is adjustable up or down or at angles on said handle by reason of its slots $e$ and $f$, and can be locked in any position by its bolt and hand-nut G.

When any large object—such as a bale of cotton, barrel, or hogshead—is to be moved, the truck is run up to it, as before described, and grip-bar E is engaged with its upper end, so that when handle C is drawn down the bale will be forcibly tilted over against studs $b$ and arms $d$. The grip-bar will also prevent the bale tilting forward off the truck while being transported.

Having described my invention, I claim—

1. The combination of a truck having a longitudinally-slotted handle, with an adjustable grip-bar, E, on said handle, having longitudinal slots $e$ and $f$, whereby it can be adjusted longitudinally and vertically on the handle, and the securing-bolt passing through the slot in the handle, and through slot $f$ in the grip-bar E, for fastening the grip-bar in any position, all constructed and arranged substantially in the manner and for the purpose described.

2. The combination of a truck having studs $b\ b$, a slotted handle, and braces D D, with an adjustable grip-bar, E, on said handle, having longitudinal slots *e f*, and its securing-bolts and nut, substantially as described.

3. The combination of a truck having studs *b b*, a slotted handle, and pointed arms *d d*, with the adjustable double-slotted grip-bar E on said handle, and the bolt F and nut G, all constructed and arranged substantially in the manner and for the purpose described.

In testimony that I claim the foregoing as my own I affix my signature in presence of two witnesses.

WILLIAM W. ROCHE.

Witnesses:
T. H. ALEXANDER,
FREAD L. TENNIS.